(12) United States Patent
Mai et al.

(10) Patent No.: US 12,675,626 B1
(45) Date of Patent: Jul. 7, 2026

(54) HARDWARE REDACTION VIA DESIGNER-DIRECTED FINE-GRAINED EMBEDDED FIELD PROGRAMMABLE GATE ARRAY INSERTION

(71) Applicant: CARNEGIE MELLON UNIVERSITY, Pittsburgh, PA (US)

(72) Inventors: Kenneth W. Mai, Pittsburgh, PA (US); Prashanth Mohan, Pittsburgh, PA (US); Ahmet Atli, Pittsburgh, PA (US); Ogun Onur Kibar, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 687 days.

(21) Appl. No.: 17/870,994

(22) Filed: Jul. 22, 2022

Related U.S. Application Data

(60) Provisional application No. 63/224,459, filed on Jul. 22, 2021.

(51) Int. Cl.
| | |
|---|---|
| *G06F 30/347* | (2020.01) |
| *G06F 30/30* | (2020.01) |
| *G06F 30/3315* | (2020.01) |
| *G06F 30/337* | (2020.01) |
| *G06F 30/34* | (2020.01) |
| *G06F 30/343* | (2020.01) |
| *G06F 30/373* | (2020.01) |
| *G06F 115/08* | (2020.01) |

(52) U.S. Cl.
CPC ........ *G06F 30/347* (2020.01); *G06F 30/3315* (2020.01); *G06F 30/337* (2020.01); *G06F 30/34* (2020.01); *G06F 30/343* (2020.01); *G06F 30/373* (2020.01); *G06F 2115/08* (2020.01)

(58) Field of Classification Search
None
See application file for complete search history.

(56) References Cited

U.S. PATENT DOCUMENTS

2023/0006674 A1 * 1/2023 Bhunia ................... G06F 21/75

OTHER PUBLICATIONS

J. Luu et al., "VTR 7.0: Next Generation Architecture and CAD System for FPGAs," ACM Trans. on Reconfigurable Technology and Systems, vol. 7, No. 2, Article 6, Jun. 2014, 30 pages. (Year: 2014).*
J. Bachrach et al., "Chisel: Constructing Hardware in a Scala Embedded Language," ACM DAC 2012, Jun. 3-7, San Francisco, CA, USA, pp. 1212-1221. (Year: 2014).*
B. Liu et al., "Embedded Reconfigurable Logic for ASIC Design Obfuscation Against Supply Chain Attacks," IEEE, 2014 EDAA, 6 pages. (Year: 2014).*

(Continued)

*Primary Examiner* — Leigh M Garbowski
(74) *Attorney, Agent, or Firm* — KDW FIRM PLLC

(57) ABSTRACT

Disclosed herein is a system and method for using reconfigurable logic for hardware redaction in which the critical IP is obfuscated by replacing it with an eFPGA, thereby entirely concealing the logic and interconnects from reverse engineers and untrusted fabrication facilities. The non-critical intellectual property of the hardware is left unaltered such that the overall VLSI overheads (e.g., area, power, and performance) can be kept to a minimum.

16 Claims, 12 Drawing Sheets

(56) References Cited

OTHER PUBLICATIONS

B. Hu et al., "Functional Obfuscation of Hardware Accelerators through Selective Partial Design Extraction onto an Embedded FPGA," ACM, Tech Session 7: Physical Design and Obfuscation, GLSVLSI '19, May 9-11, 2019, Tysons Corner, VA, USA, pp. 171-176. (Year: 2019).*

P. Mohan et al., "Top-down Physical Design of Soft Embedded FPGA Fabrics," ACM, Session 1: FPGA Architecture, FPGA '21, Feb. 28-Mar. 2, 2021, Virtual Event, USA, pp. 1-10. (Year: 2021).*

D. Koch et al., "FABulous: An Embedded FPGA Framework," ACM, Session 1: FPGA Architecture, FPGA '21, Feb. 28-Mar. 2, 2021, Virtual Event, USA, pp. 45-56. (Year: 2021).*

C. Pilato et al., "Assure: RTL Locking Again an Untrusted Foundry," IEEE Trans. on Very Large Scale Integration (VLSI) Systems , vol. 29, No. 7, Jul. 2021, pp. 1306-1318. (Year: 2021).*

* cited by examiner

HARDWARE REDACTION VIA DESIGNER-DIRECTED FINE-GRAINED EMBEDDED FIELD PROGRAMMABLE GATE ARRAY INSERTION

RELATED APPLICATIONS

This application claims the benefit of U.S. Provisional Patent Application No. 63/224,459 filed Jul. 22 2021, the contents of which are incorporated herein in their entirety.

GOVERNMENT INTEREST

This invention was made with United States government support under contract FA8650-18-1-7818 awarded by the U.S. Air Force Research Laboratory and contract DE-NA0003525 awarded by the U.S. Department of Energy. The U.S. government has certain rights in the invention.

BACKGROUND

Due to the rapidly increasing cost of building and maintaining silicon manufacturing facilities with technology scaling, there has been a steady decline in the number of integrated circuit (IC) fabrication facilities offering state-of-the-art process technologies. As a result, both companies and governments have been forced to rely on untrusted third-party silicon fabs. Reliance on untrusted fabrication reduces the control over the security of chips and introduces a number of threats such as reverse engineering, theft of intellectual; property, overproduction, trojans, and counterfeiting. In recent years, IC reverse engineering and IC fabrication supply chain security have grown to become significant economic and security threats for designers, system integrators, and end customers.

Many of the existing logic locking and obfuscation techniques have shown to be vulnerable to attack once the attacker has access to the design netlist either through reverse engineering or through an untrusted fabrication facility. As such, there has been significant effort in developing new techniques to design hardware that is resistant to such IP threats.

Hardware obfuscation methods such as logic locking, gate camouflaging, split-manufacturing, and reconfigurable logic are a few of the solutions that have been proposed. While logic locking has gained attention as a possible low overhead obfuscation solution, many of the existing logic locking schemes have been broken by satisfiability-based (SAT) attacks. Additionally, many SAT-resilient locking methods suffer from low output corruptibility when the wrong key is applied to unlock the circuit

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an alternative approach based on using reconfigurable logic called hardware redaction. In the intelligence community, it is common practice to redact sensitive information from documents before release to untrusted parties. This includes obfuscation of entire sections, paragraphs, sentences, or even single words/numbers. This allows fine grained obfuscation of critical information from public release.

The invention employs an analogous capability for hardware designers enabling the obfuscation of selected portions of a hardware design as shown in FIG. 1. This method differs significantly from other types of logic locking/obfuscation where an entire block is obfuscated and a tool chooses which specific gates to camouflage/obfuscate. Those techniques have been shown to be vulnerable to a variety of attacks using SAT-solvers and ATPG-based methods, because there is still information leakage from the un-camouflaged/locked gates. In the method of the present invention, only the critical IP is fully obfuscated by replacing it with an eFPGA, entirely concealing the logic and interconnect from reverse engineers and the untrusted fabrication facility. Additionally, by not altering the non-critical intellectual property, the overall VLSI overheads (e.g., area, power, and performance) can be kept to a minimum.

BRIEF DESCRIPTION OF THE DRAWINGS

FIGS. 12A-C show shmoo plots of original and redacted versions of the RISC-V design on a 22 nm finFET process.

DETAILED DESCRIPTION

Figure 1:
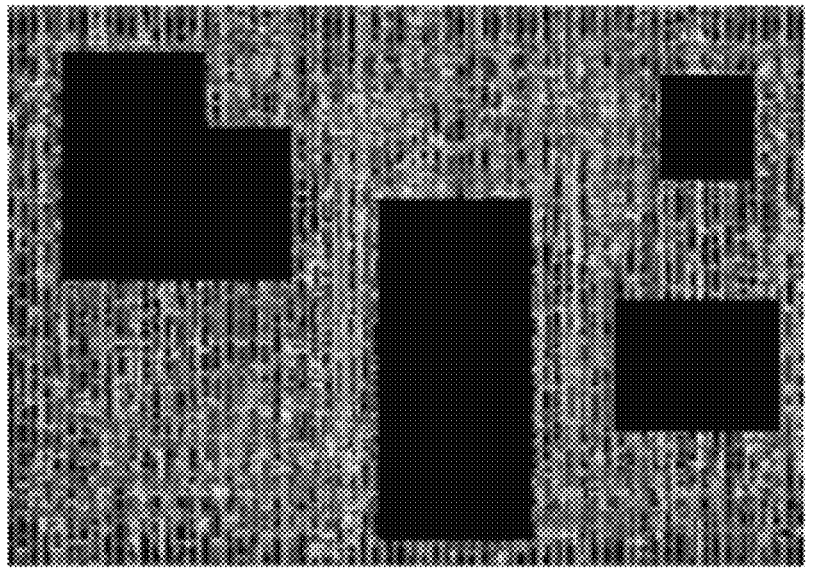
FIG. 1 shows a comparison of the reduction process of the present invention with redaction process typically used for paper documents.
Figure 1:
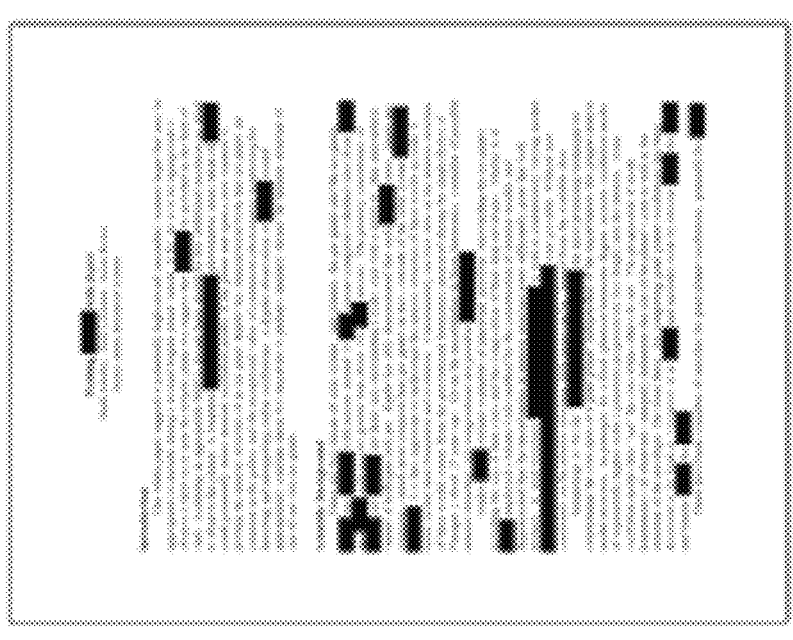

FPGAs are the most widely used reconfigurable circuits due to their versatility and the wide range of logic functions that they can perform. Structurally, FPGAs consist of a 2D array of complex logic blocks (CLBs) that are interconnected through a routing fabric. The CLBs contain look-up tables (LUTs) that can be configured to perform arbitrary logic functions, and the routing fabric contains routing channels and interconnect multiplexers to connect the CLBs together. An embedded FPGA (eFPGA) has the same architectural features as an FPGA, but its main difference is that while FPGAs are stand-alone parts, eFPGAs interact with other IP blocks on the same die, most often within a system-on-chip (SoC) environment. Therefore, eFPGA is an ideal candidate for use in reconfigurable logic-based hardware obfuscation.

Though the reconfigurability of eFPGA makes it an ideal candidate for hardware obfuscation, the use of eFPGA fabrics for fine-grained hardware redaction comes with its own set of challenges. Previous works considered the use of eFPGAs for obfuscation but they assume the availability of a ready-made eFPGA hard macro IP to obfuscate the designs. While eFPGA hard macro IPs can be purchased from commercial vendors, these are not suitable for fine-grained obfuscation because they are typically organized into very large blocks (1K-4K LUTs) and the end user cannot fine-tune the eFPGA architecture parameters to match the redacted design.

To enable fine-grained eFPGA redaction, the ability to rapidly and automatically generate eFPGA fabrics of different sizes and architectural parameters that match the redacted portions of the design are needed.

There is also a lack of CAD tool flows that support combined logic synthesis, timing analysis, and optimization of a mixed ASIC and FPGA design. To address this issue, the use of a specialized transistor-level programmable fabric along with its own tool-flow for obfuscation has been proposed. While specialized programmable fabrics can decrease area and delay overheads, designing custom layout in modern process technology requires extensive design time/effort and has poor process portability, which are not compatible with typical SoC design schedules, budgets, and fab diversity requirements. Thus, using "soft" eFPGA based designs that specify the eFPGA fabric in RTL and use the conventional standard cell-based CAD tool flow to implement the physical design are more appropriate for many SoC designs.

To address the aforementioned challenges and realize fine-grained hardware redaction, disclosed herein is a soft eFPGA based redaction flow using a top-down design methodology. The soft eFPGA redaction flow uses multiple open-source tools in tandem to generate soft eFPGA fabrics of various sizes with different architectural parameters. In addition to that, the flow can perform logic synthesis, timing analysis, and optimization of the mixed ASIC and soft eFPGA design as a whole without introducing significant deviations to the standard ASIC physical design flow.

Figures 2A, 2B, 2C:
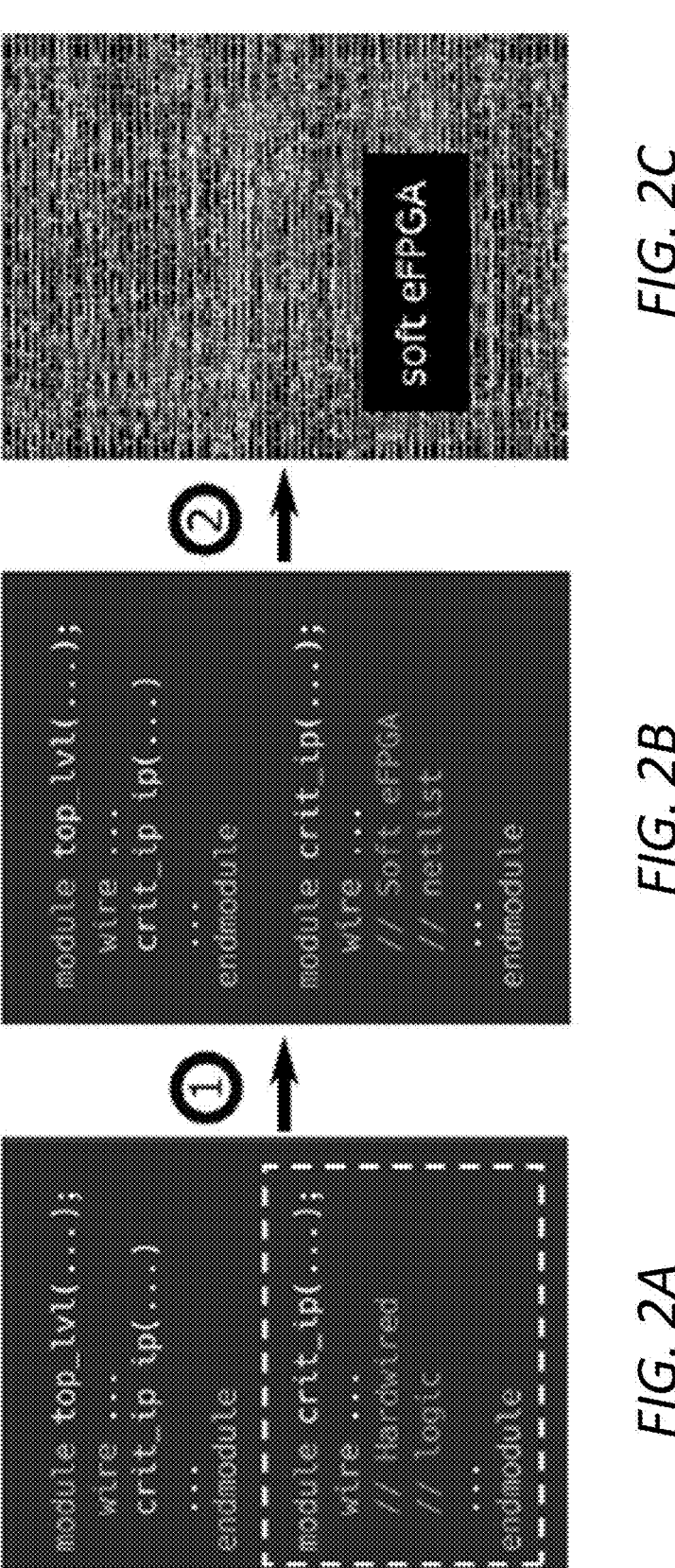
FIGS. 2A-C show an overview of the redaction flow starting from the original marked Verilog to the final redacted layout.
Figure 3:
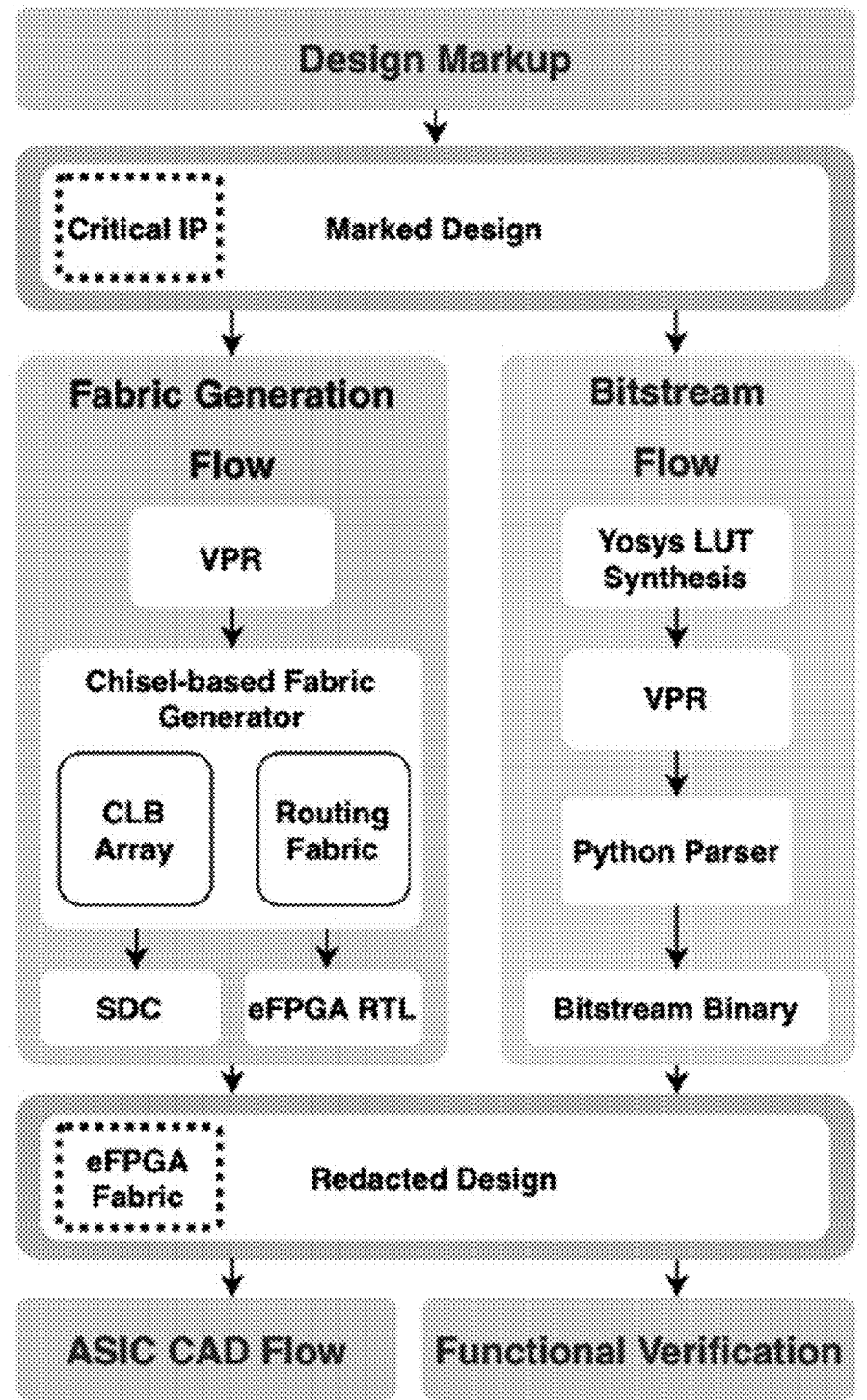
FIG. 3 is a block diagram showing a detailed design flow for redacted RTL generation and verification.

Soft eFPGA redaction allows hardware designers to obfuscate selected portions of an IP in a fine-grained manner, analogous to how sensitive information in documents is redacted as illustrated. An overview of the soft eFPGA redaction flow is shown in FIG. 2, and a detailed design flow is shown in FIG. 3. The designer starts with a description of the design expressed in a hardware description language, for example, Verilog, as shown on FIG. 2(a), and marks the critical IP that needs to be redacted, as shown in FIG. 2(b). Then, the fabric generation flow automatically determines the smallest eFPGA fabric required to map the redacted module onto an eFPGA. The disclosed invention includes a fabric generator. The corresponding eFPGA module is generated using the fabric generator and the marked critical IP module is replaced with the eFPGA module to obtain the redacted design, as shown on FIG. 2(c). The eFPGA module does not contain any design details of the security-critical IP, and the desired functionality can only be achieved by loading the eFPGA with the correct configuration bitstream. The fabric generator also generates Static Timing Analysis (STA) constraints that can be used to synthesize and optimize the eFPGA fabric.

The redacted design, as well as the generated STA constraints, are passed on to a standard ASIC physical design flow to generate the redacted layout.

Fabric generation flow is responsible for generating the redacted design with the eFPGA fabric, the bitstream required to map the critical IP onto the eFPGA fabric, and the STA constraints required for the physical design tools. The first step in the fabric generation flow is to synthesize the marked critical module into LUTs using an open-source synthesis tool (e.g., Yosys). The synthesized LUT netlist is then passed on to the VTR/VPR tool to place and route the redacted module. During the place and route process, VPR identifies the smallest fabric size and routing channel width required to map the design onto the eFPGA fabric. The VPR output files, which include information about the fabric size, channel width, and other fabric architecture parameters, are passed on to the fabric generator. The fabric generator outputs the eFPGA hardware description language (e.g., Verilog) RTL along with the STA timing constraints that are necessary for downstream physical design tools. Bitstream generation is done by processing VPR output files through custom Python scripts. The resulting bitstream is used to verify the functionality of the redacted module on the soft eFPGA using logic equivalence checking (LEC) and test benches (e.g., cocotb).

Figure 4:
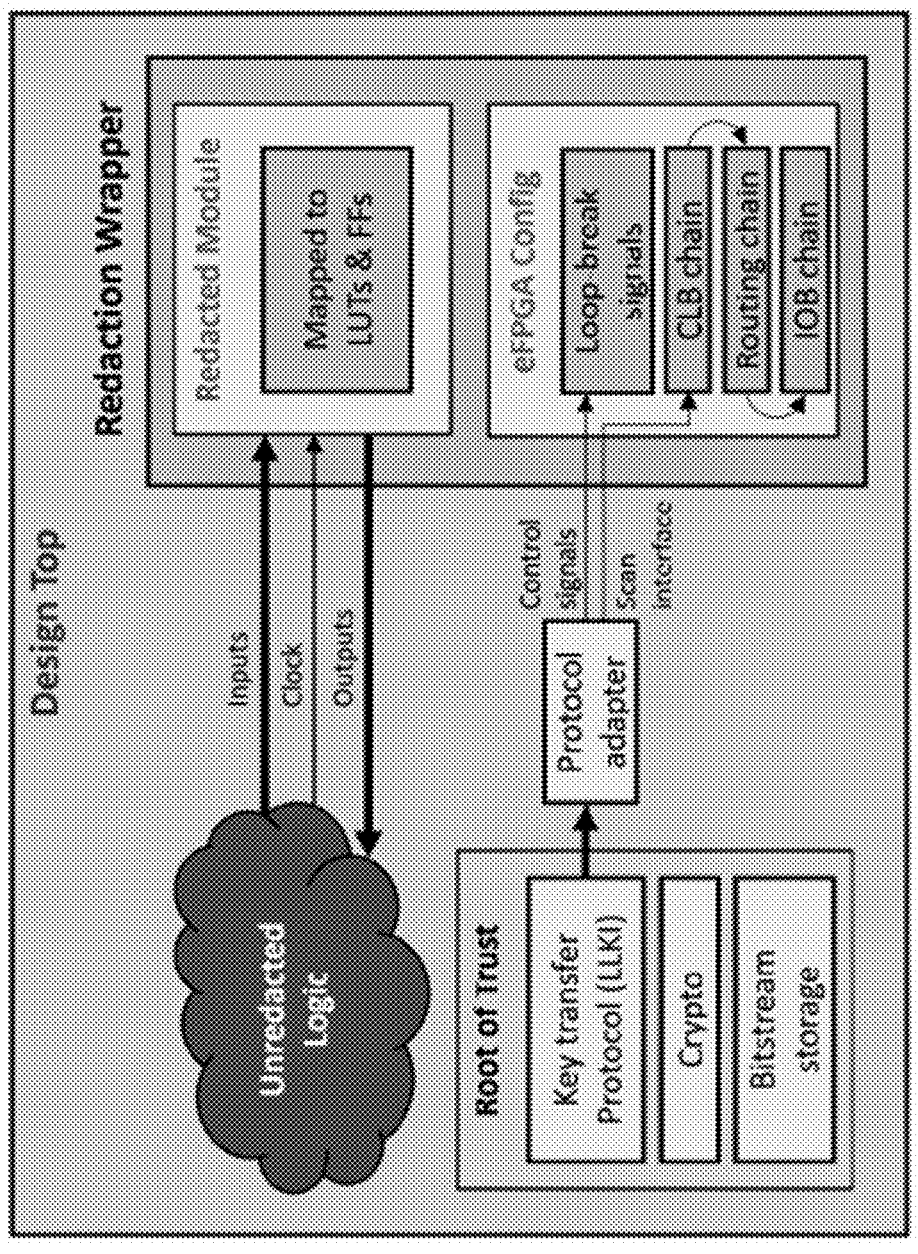
FIG. 4 is a block diagram showing the integration of redacted logic into a top-level design
Figure 4:
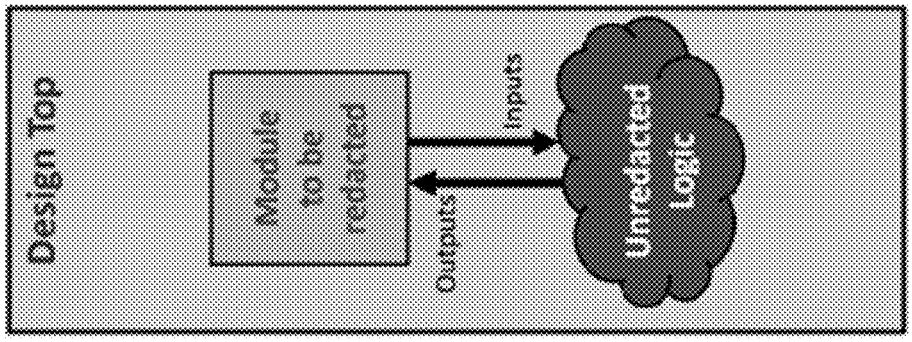

After generating the soft eFPGA fabric for redacting the sensitive IP, it needs to be integrated into the original design with additional logic for configuring the eFPGA fabric. The fabric generator has a wrapper class that helps with instantiating the eFPGA into the design. It also exposes the configuration scan chains so that they can be connected to a configuration interface that transfers the secure bit-stream from a root-of-trust to eFPGA, as shown in FIG. 4, which is a block diagram showing the integration of redacted logic into the top-level design. The redacted and the unredacted logic in the ASIC are connected using the eFPGA IOBs. The eFPGA configuration bitstream is stored in the Root of Trust (ROT) and transferred to the eFPGA using the RoT's key transfer protocol (e.g., LLKI). A protocol adapter is used to covert data packets from the LLKI interface protocol into a serial bitstream for loading into eFPGA.

Redacted logic can contain both combinational gates and registers, and they will be mapped to LUTs and registers in the eFPGA fabric. The eFPGA configuration bit-stream is stored in the scan chain, which is controlled by the root of trust. The root-of-trust can configure or erase the bit-stream in the eFPGA using an interface such as Logic Locked Key Interface (LLKI). A protocol adapter converts bitstream data packets sent using the LLKI interface into a serial bit-stream for loading into eFPGA configuration scan chains. The eFPGA configuration interface contains loop-break signals timing optimization and ATPG compatibility.

A generic eFPGA IP has to offer satisfactory delay, power, and area metrics for any application mapped on to the fabric. Generic timing optimization is necessary for the paths between the logic blocks so that the logic synthesis is application agnostic. This is not the case for an eFPGA that will be used for redaction, as the design that will be implemented is known prior to its synthesis. This means that the paths within the fabric that will be exercised during operation are also known, and the CAD tools can make use of this information to optimize the fabric further. Although this optimization would minimize the overhead of redaction, the buffering and gate sizing efforts by the tools might make the optimized paths easier to determine, and help the attackers narrow down some of the routing configuration bits.

Even if the attacker can narrow down a portion of the routing configuration bits, the design is still highly resilient to SAT attacks.

To explore the differences between generic and design-specific eFPGA fabrics, two different versions of redacted designs were implemented. For the first version, we generate STA constraints to optimize all the channel wires of the fabric in a bitstream-agnostic manner. This version is referred to as eFPGA_generic. For the second version, the paths that are exercised in the redacted design that will be mapped to the eFPGA by translating the bitstream into additional STA constraints were further optimized. This design-specific version is referred to as eFPGA_opt.

To evaluate the overheads and the effectiveness of eFPGA redaction, we obfuscated two different designs: a RISC-V CPU core and a GPS P-code generator. The security-critical modules in the designs were mapped to eFPGA_opt and eFPGA_generic fabrics and the designs were implemented on an industrial 22 nm FinFET CMOS process using the foundry supplied standard cells libraries. The VLSI metrics are derived from post-layout extracted designs using Cadence Innovus.

SAT attacks were also performed on the eFPGA fabric and show that the designs are resilient to SAT attacks.

Figures 5A, 5B, 5C:
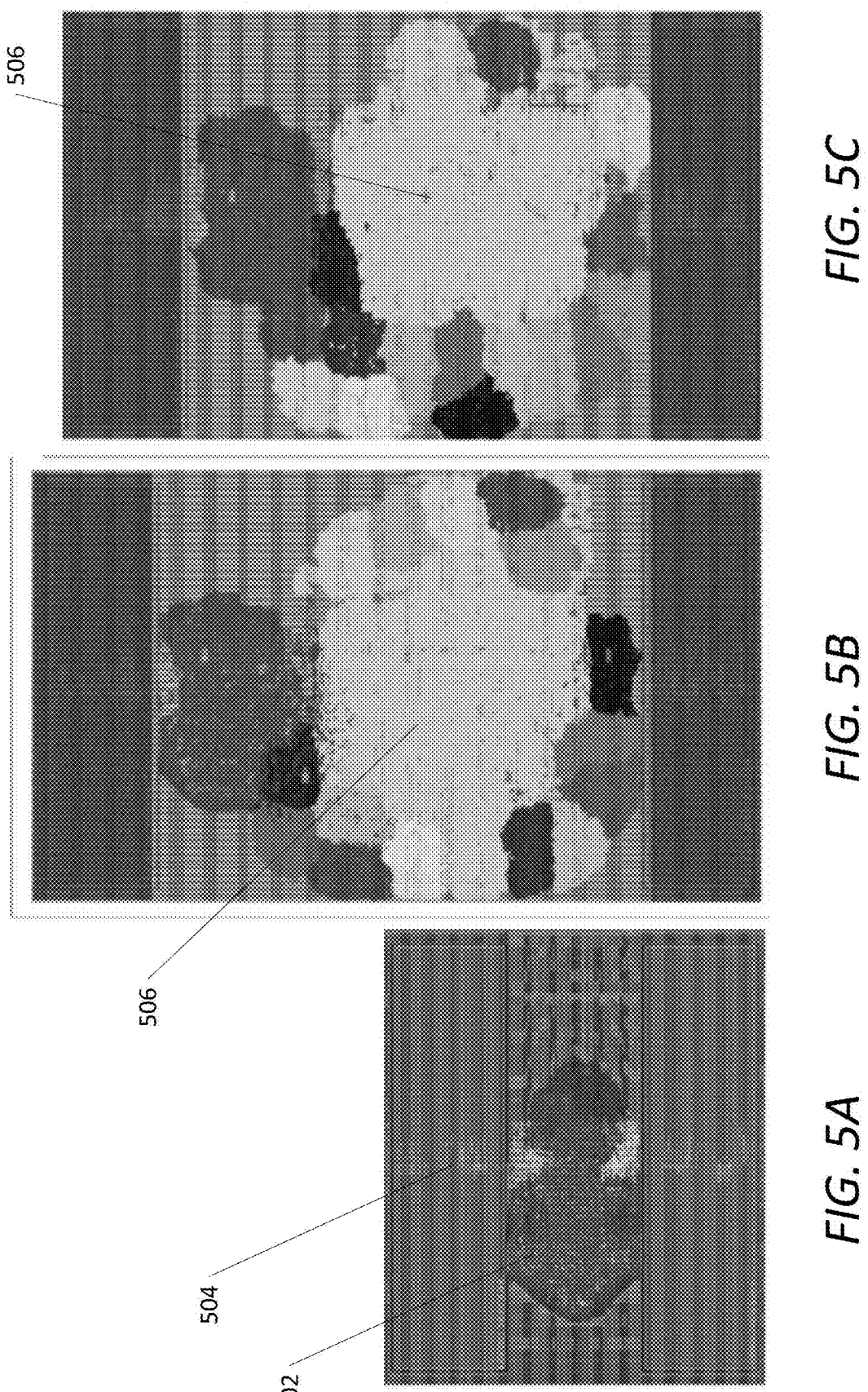
FIGS. 5A-C show the layout of an original RISC-V design for first circuit as well as two other layouts prepared in accordance with the present invention.

The first design that was obfuscated is a 32-bit RISC-V CPU core compatible with the RV321 instruction set. It is a 5-stage pipelined architecture with single-port 6T-SRAM based 16 KB instruction and data memories. A scalar CPU core has many elements that are relatively standard across different designs, such as the adder and the multiplier, but the control logic is unique to the architecture. For this reason, to obfuscate the RISC-V core, the control path was redacted using a soft eFPGA fabric. The control path was mapped onto a 4×4 eFPGA fabric with 8 LUT4s and 44 channels. FIGS. 5A-C shows the final layout highlighting the tile locations and routing fabric locations for the eFPGA_generic and eFPGA_opt designs respectively. Configuration storage in the scan chains accounts for approximately half of the area overhead. The control path area shown in FIG. 5A increased by a considerable amount after the redaction, but the figure shows that the overall area overhead is less than 2× with the eFPGA_opt redaction. FIG. 5A shows the layout of the original RISC-V design. The datapath cells 502 and control path cells 504 are shown. FIG. 5B shows the layout of eFPGA_generic and FIG. 5C shows the layout of the eFPGA_opt designs. The eFPGA tiles are highlighted shown surrounding the routing fabric 506 in FIGS. 5B-C. This overhead factor is larger in RISC-V compared to the GPS P-code generator, because in the RISC-V, the number of redacted cells is a larger percentage of the overall system cell count. In this particular case, the critical path goes through the stall logic, which lies in the control path. This results in delay overhead even in eFPGA_opt method, unlike the GPS test case. However, the overhead is less than the eFPGA_generic design, due to design-specific optimization.

The second design that was obfuscated is the GPS code generator found in the MIT Lincoln Labs Common Evaluation Platform (CEP). This is a reference implementation of the circuit that is designed to evaluate different obfuscation methods that can protect a GPS module from untrusted fabrication. The disclosed invention obfuscates the following three security-critical attributes of a GPS module as per the CEP documentation: (1) the length of P-code generator; (2) the position of taps for P-code generator; and (3) the initial value used by P-code generator.

Figures 6A, 6B, 6C:
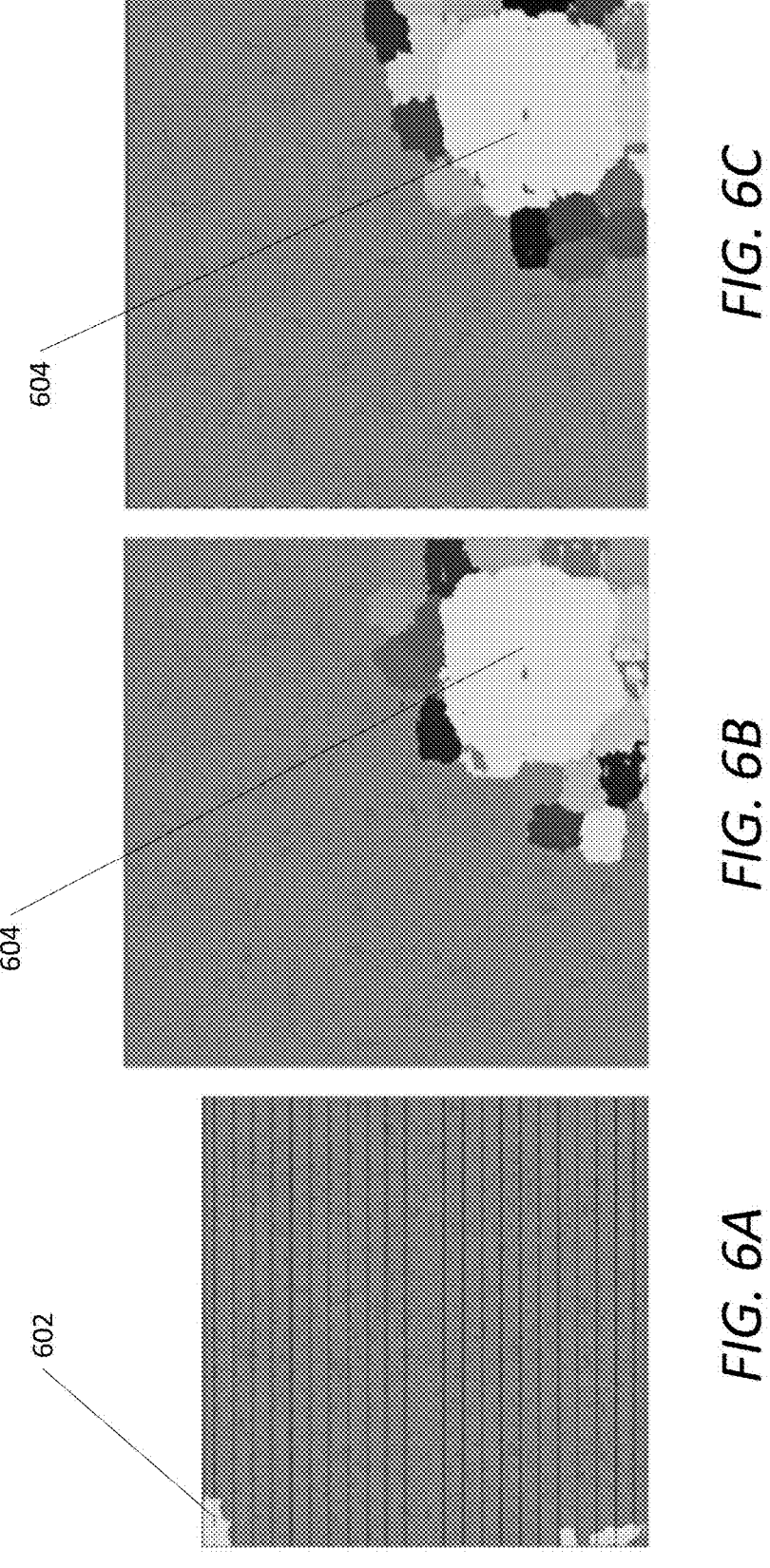
FIGS. 6A-C shows the layout of an original design for a second circuit as well as two other layouts prepared in accordance with the present invention.

To conceal this information, the next state logic of the linear feedback shift registers (LFSRs) that are used to generate the P-code were redacted. The fabric hides the initial reset value and feedback logic function within the configuration bits. The rollover value of the LFSRs on the configuration scan chain, which obfuscates the length of the P-code were also added. A 4×4 eFPGA fabric with 8 LUT4s per CLB was able to implement this desired functionality. FIGS. 6A-C shows the final layout highlighting the tile locations and routing fabric locations for the eFPGA_generic and eFPGA_opt designs respectively. FIGS. 6A-C show the layout of the original, the eFPGA_generic, and the eFPGA_opt redacted GPS designs, respectively. The P-code generator 602 is shown in the original design. In the redacted designs, the routing fabric 604 is shown surrounded by the logic blocks.

Figure 7:
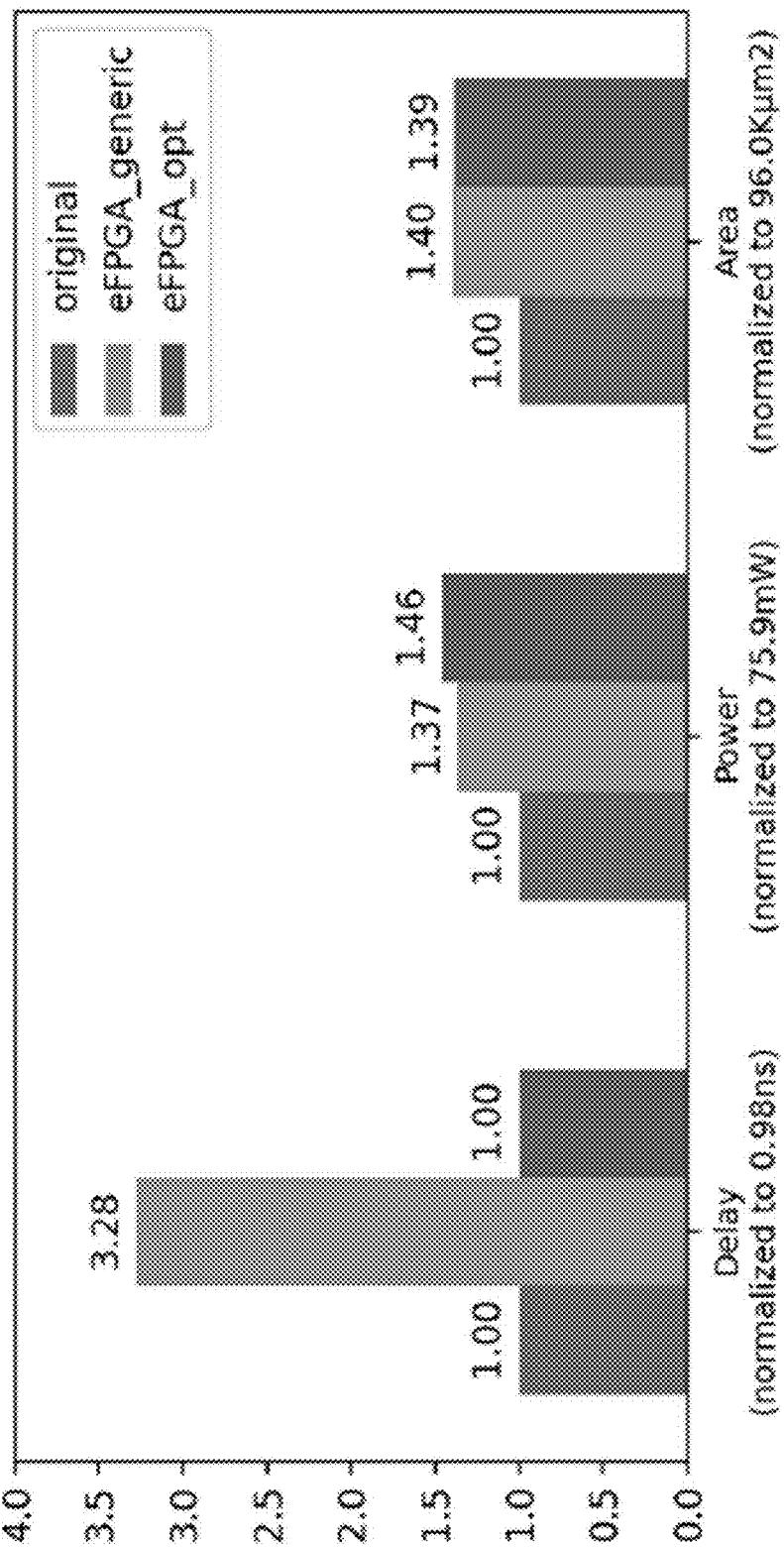
FIG. 7 is a graph comparing delay, power and area overheads for original and redacted RISC-V designs.

FIG. 7 shows that eFPGA_opt and eFPGA_generic versions are very similar in terms of area, but there is a significant difference in delay. eFPGA_generic delay incurs 3.21× delay overhead, while eFPGA_opt version does not incur any delay overhead. This is because the critical path of the design is not through the eFPGA, and the eFPGA_opt version can optimize the fabric delay below the critical path in the design. Because the eFPGA_generic version has no information on which paths will be exercised, the same optimizations cannot be performed by the tool, and the generic fabric ends up having higher delay than the other paths in the GPS core.

Figure 8:
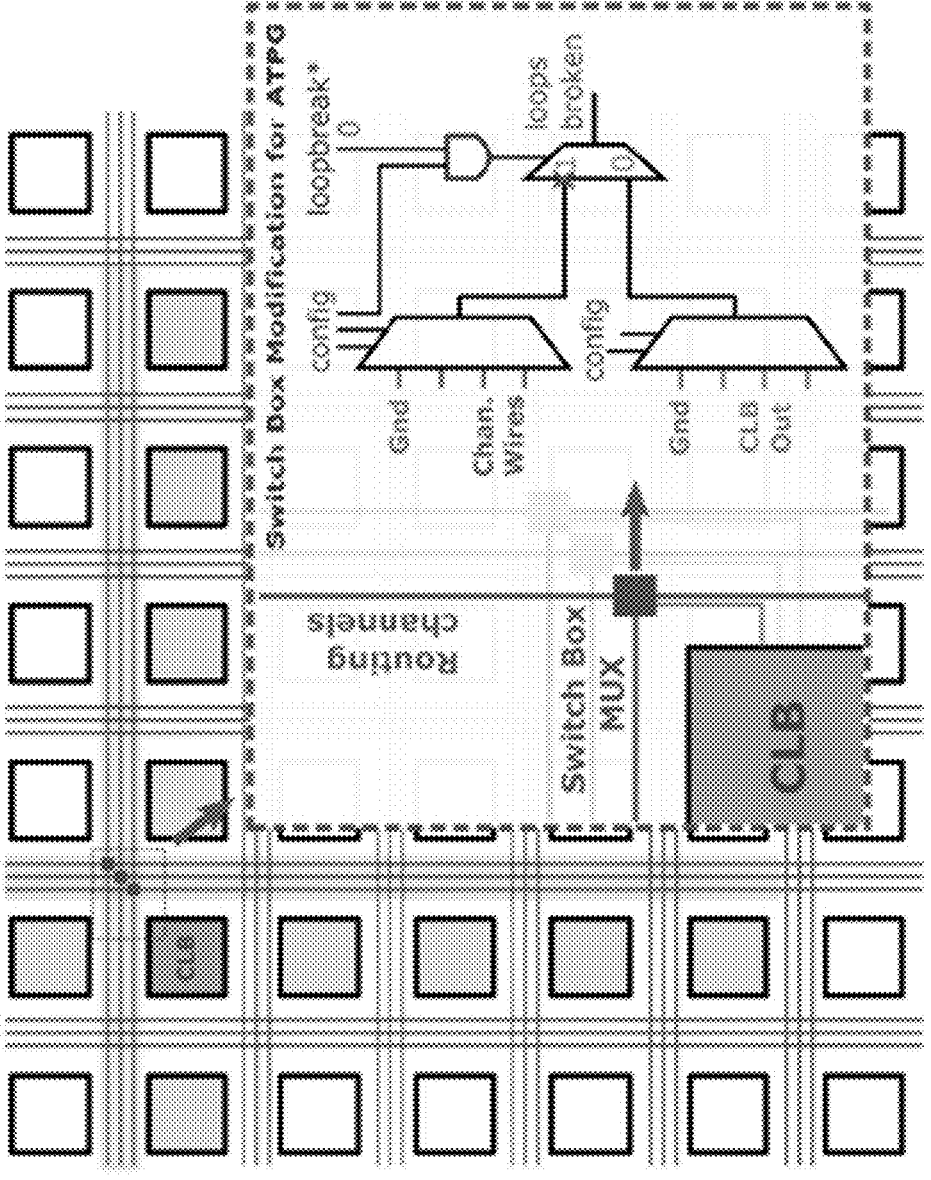
FIG. 8 is a block diagram showing a method for eliminating combinational loops in an eFPGA fabric.

When logic is redacted using a soft eFPGA, the design must be fully compatible with physical design and production steps without the need to reveal the bit-stream of the redacted design to IC foundries or IC test service providers. This means that the soft eFPGA should be compatible with the design for test (DFT) and automatic test pattern generation (ATPG) flows, and the design or the generated test vectors should not leak any information about the redacted design other than what can be deduced from the IOs and size of the eFPGA fabric. Like ASIC timing optimization tools, ATPG tools cannot work on a design with combinational loops in the soft eFPGA fabric. When using an SDC file to break the timing loops, case analysis exceptions can be defined on any arbitrary node in the circuit. This is not possible using ATPG tools, and the loops have to be broken physically in the circuit by applying a logic value to the switch blocks where the loops are broken. The circuit shown in FIG. 8 uses loopBreak signals, one for each set of switch blocks that drive the channels wires in each of the four directions. These loopBreak signals are brought out of the design for the ATPG tool to control the value on these wires during the IC testing process. The ATPG tool achieved 98.7% coverage for the GPS design and generated 323 patterns to test the design.

To demonstrate the security efficacy of eFPGA redaction, a series of experiments were performed in which we mounted the SAT attack on the redacted netlists. The attacks were performed through the eFPGA IO. It was assumed that the attacker would have access to the eFPGA IO, because a DFT scan chain is necessary to allow visibility into the faults inside the eFPGA during testing. All SAT attack trials ran with a timeout of 12 hours on a workstation with a 32-core 2.5 GHz AMD EPYC 7502P CPU and 1 TB DDR4 memory.

A miter-based SAT attack was used to evaluate the attack resilience of eFPGA redaction. This attack uses the redacted netlist and unlocked circuit to iteratively produce input-output (IO) relationships and rules out keys that don't produce the same behavior. If a circuit contains stateful cycles under any input or key combination, miter-based SAT attacks will potentially get stuck in an infinite loop. Because eFPGA fabrics contain numerous cycles due to their flexible interconnect network, the miter-based SAT attacks do not terminate. To enable the experiments, the CycSAT algorithm that allows the attack to run to completion in cyclic circuits by adding constraints to the attack formulation was implemented. These constraints rule out any key that creates cycles in the design.

Figure 9:
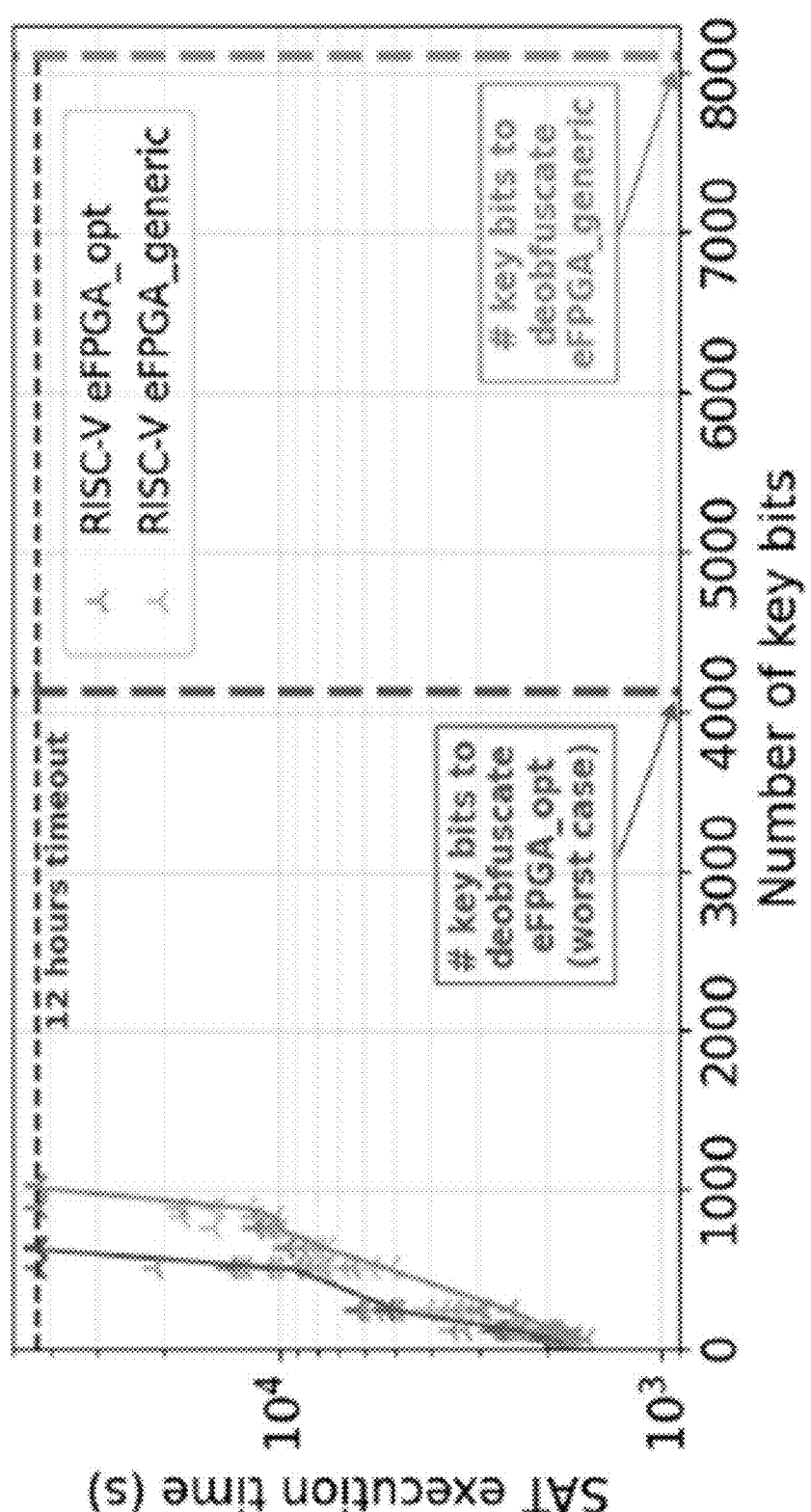
FIG. 9 is a graph showing SAT attack runtimes for redacted RISC-V designs mapped onto a 4×4 soft eFPGA fabric.

The attack resistance of eFPGA redaction was evaluated by mounting the SAT attack on the redacted RISC-V, which contains a total of 8119 configuration bits. The SAT formulation contains approximately 600 million clauses and 250 million variables, most of which are due to acyclic constraints generated by CycSAT. The attack unsurprisingly times out in this setting. To better understand how the attack time scales with the number of eFPGA configuration bits, a modified SAT attack was run where a fraction of the key bits were retained as variables to be solved by the attack and hard code the rest of the key bits to their correct value. Multiple experiments were run by slowly increasing the number of unknown key bits and plotting the corresponding SAT attack run times, as shown in FIG. 9. Which shows that SAT attack runtimes for redacted RISC-V design mapped onto a 4×4 soft eFPGA fabric increase exponentially with the number of key bits. The blue and orange vertical lines indicate that the SAT attack run times required to de-obfuscate the RISC-V design will take multiple orders of magnitude longer than the timeout period of 12 hours.

The unknown key bits are chosen randomly, distributed equally between LUT and routing configuration bits. Multiple trials are run for each experiment to account for the variability in SAT attack run times due to random selection. The various points marked in FIG. 9 represent the SAT attack runtime for each of these random trials. The lower bound of the SAT attack runtime was plotted for each experiment to visualize the growth of SAT run times with increasing number of key bits.

Another way to interpret FIG. 9 would be to consider the case where an adversary is able to reverse engineer a fraction of the total configuration bits of the eFPGA through side channels or probing methods. The exponential increase in SAT attack runtime shows that the redacted RISC-V design is secure even when the attacker can reverse engineer a sizeable chunk of the configuration keyspace. All of the trials time out when the number of key bits is equal to or greater than 1024 bits, which is 12.6% of the total configuration bits in the 4×4 tile eFPGA used in the example design. The timed out datapoints were placed on the 12-hour timeout line in the plot. In reality, the time taken to solve the designs can be much greater. As an example, a trial with 1024 key bits was run without any timeout as an additional experiment and found that it took 3 days to finish which reinforces the exponential growth of the SAT run time.

To address possible concerns with respect to information leakage in eFPGA_opt, a set of additional SAT experiments was run in which the variable key bits are selected from a reduced configuration keyspace that includes only the routing multiplexers and LUTs that are used by the RISC-V design mapped onto the eFPGA. In this case, it is assumed that the attacker is able to extract all potential information from the structure of eFPGA_opt. This requires the attacker to identify the timing target, extract the timing of every path inside the eFPGA fabric, and analyze which paths are not optimized to that target. Those paths will consist of the routing multiplexers and LUTs that are not used by the mapped RISC-V design. However, by reducing the configuration keyspace to 4133 used configuration bits, we can account for the information leakage in the eFPGA_opt design and estimating the worst-case SAT attack runtimes by providing a maximum advantage to the attacker. Even under these worst-case conditions, the eFPGA_opt design is highly resilient to SAT attacks as the SAT attack runtimes still follow an exponential trend as shown in the blue eFPGA_opt plot in FIG. 9.

To extend the attack results to other types of circuits, the attack was performed on the GPS P-code generator previously described and a set of ISCAS'85 benchmark circuits (c432, c880, c1355, c1908) that fit on the 4×4 eFPGA fabric that is used in the redacted RISC-V CPU. These attacks were performed on an eFPGA with 54 routing channels as opposed to 44 channels, because a minimum of 54 channels is needed to route all of the benchmarks covered in these experiments.

Figure 10:
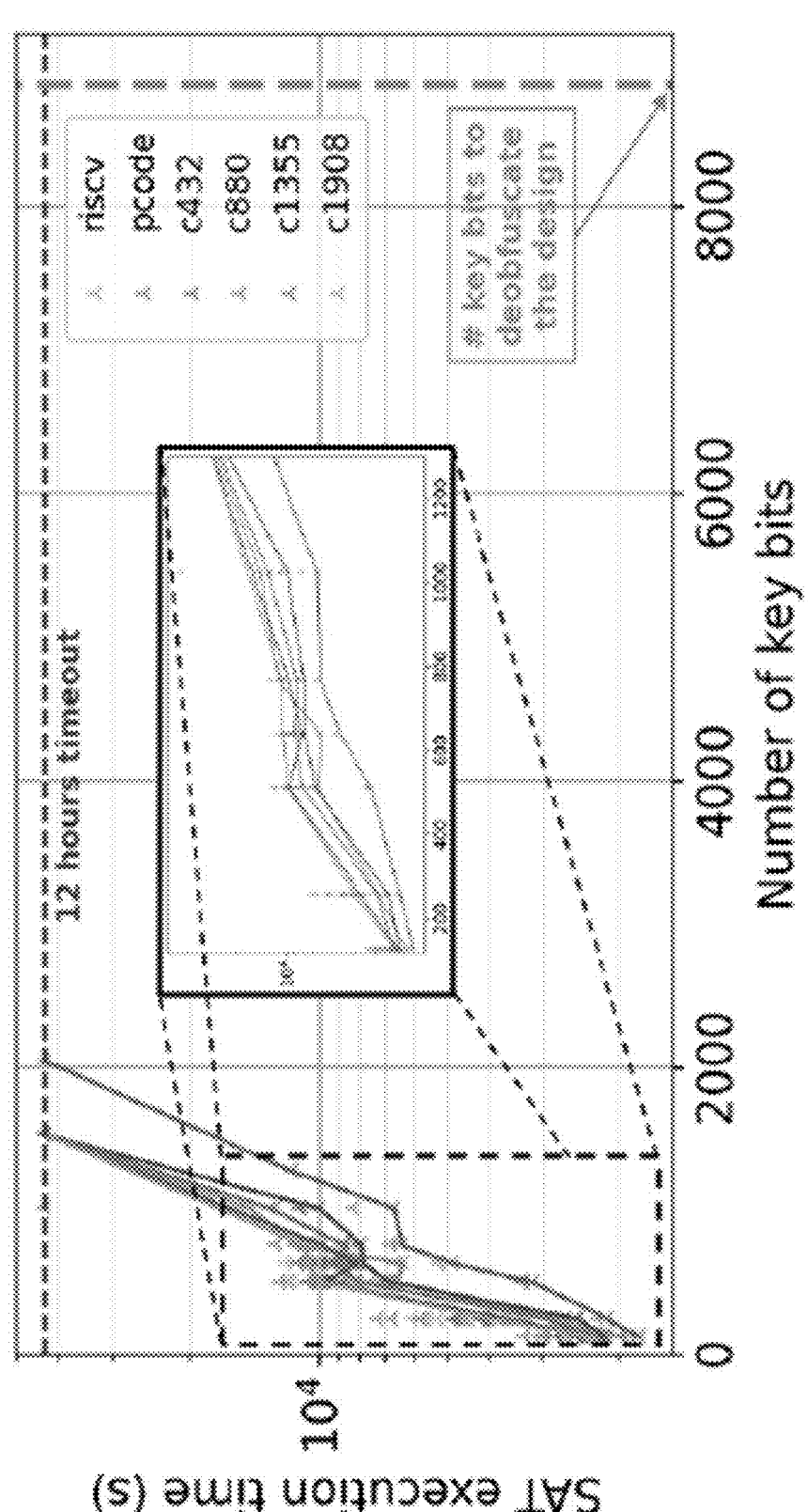
FIG. 10 is a graph showing SAT attack runtimes for the RISC-V P-code generator mapped onto a 4×4 Eve FPGA fabric.

As seen in FIG. 10, the SAT attack runtime trends of the ISCAS'85 benchmarks are similar to the trend of the RISC-V, which was shown to be SAT-resilient. This result shows that the redaction approach can be used to secure a variety of circuit types and is not limited to RISC-V control logic. The P-code design has a relatively lower runtime compared to the other designs, but the SAT attack runtimes still show an exponential trend. The relatively lower SAT attack runtime is likely caused by the P-code's low logic depth, which is known to have a strong effect on the SAT attack runtime.

Figure 11:
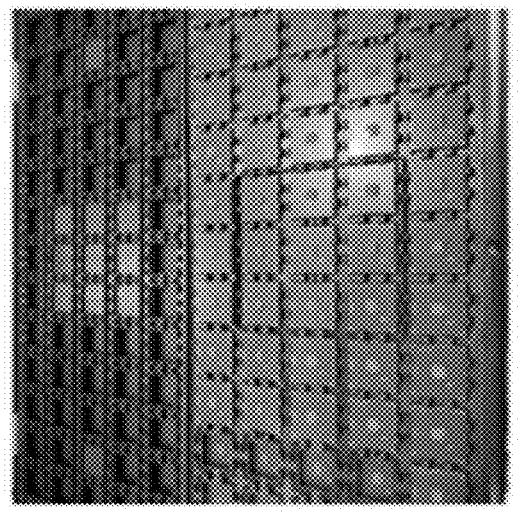
FIG. 11 shows a layout screenshot of original and redacted versions of the RISC-V design on a 22 nm test chip.
Figure 11:
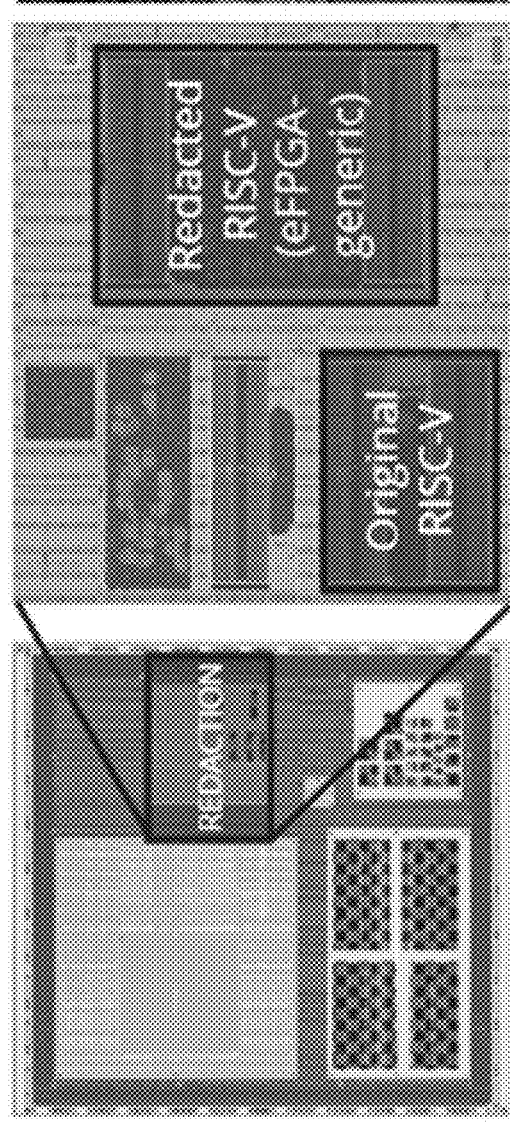
Figures 12A, 12B:
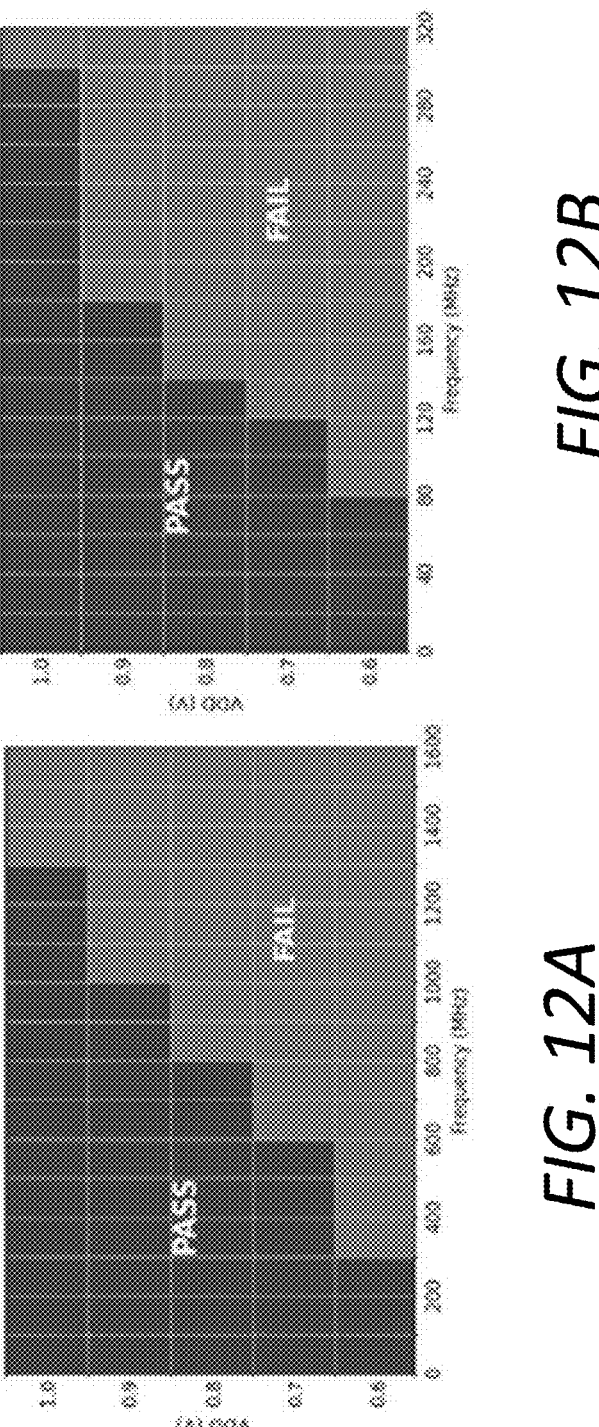

A proof-of-concept test chip was fabricated on an Intel 22 nm FinFET process to verify the disclosed hardware redaction methodology. The layout capture of the original and redacted (generic) version of the RISC-V design is shown in FIG. 11, which shows the Layout screenshot of original and redacted version of the RISC-V design on a 22 nm test chip. The shmoo plots of the original and redacted RISC-V designs are also shown in FIGS. 12A-B, which shows Shmoo plots of the original in FIG. 12A and the redacted version of the RISC-V design on a 22 nm FinFET process in FIG. 12B. Original and redacted designs can operate up to 1.3 GHz and 300 MHz respectively. The un-redacted RISC-V processor can operate at a frequency of 1.3 GHz at 1V, and the generic RISC-V redacted design can operate at a frequency of 300 MHz at 1V. The measured delay overhead of the redacted design is 5.7× at 0.8V and 4.3 at 1V, which are in line with estimated post-layout delay estimates.

It should be noted that, in various embodiments, any eFPGA could be used to perform the redaction as described herein. However, in preferred embodiments, an eFPGA designed in accordance with a top-down methodology, as described in co-pending U.S. patent application Ser. No. 17/870,953, filed Jul. 22, 2022, entitled "Top-Down Physical Design of Soft-Embedded FPGA Fabrics" (the contents of which are incorporated herein by reference) would be used.

The invention has been described in the context of specific embodiments, which are intended only as exemplars of the invention. As would be realized, many variations of the described embodiments are possible. For example, variations in the design, shape, size, location, function and operation of various components, including both software and hardware components, would still be considered to be within the scope of the invention, which is defined by the following claims.

As would be realized by one of skill in the art, the disclosed systems and methods described herein can be implemented by a system comprising a processor and memory, storing software that, when executed by the processor, performs the functions comprising the method.

As would further be realized by one of skill in the art, many variations on implementations discussed herein which fall within the scope of the invention are possible. Specifically, many variations of the architecture of the model could be used to obtain similar results. The invention is not meant to be limited to the particular exemplary model disclosed herein. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method for hardware-based redaction of a circuit to obscure redacted portions of the circuit comprising:
   receiving an indication of one or more portions of the circuit to be redacted;
   determining, for each redacted portion of the circuit, a smallest eFPGA fabric required to map the redacted portion onto an eFPGA;
   generating the smallest eFPGA fabric for each of the one or more portions of the circuit to be redacted;
   replacing, in a soft design of the circuit, each of the one or more redacted portions of the circuit with the eFPGA fabric generated for that redacted portion to create a mixed ASIC/eFPGA design;
   performing a logic synthesis and timing analysis of the mixed ASIC/eFPGA design; and
   generating a layout of the redacted circuit, including the eFPGA fabrics generated for each of the redacted portions based on the mixed ASIC/eFPGA design.

2. The method of claim 1 further comprising:
   generating a soft description of the circuit; and
   generating a gate-level description of the circuit.

3. The method of claim 1 wherein the soft design is represented in a hardware description language and wherein the indication of one or more portions of the circuit to be redacted comprises marked portions of the hardware description language describing the one or more redacted portions.

4. The method of claim 3 wherein the hardware description language is Verilog.

5. The method of claim 4 wherein the eFPGA fabrics generated for each of the one or more redacted portions do not contain any design details of the redacted portions of the circuit.

6. The method of claim 5 wherein the hardware description language describing each eFPGA is generated using a fabric generation tool.

7. The method of claim 6 wherein the fabric generation tool generates static timing analysis constraints for use in synthesizing and optimizing each of the eFPGA fabrics.

8. The method of claim 7 wherein the fabric generation tool generates the configuration bitstream for each of the eFPGA fabrics.

9. The method of claim 8 wherein redacted design and static timing analysis constraints are used by a standard ASIC physical design flow to generate the layout of the redacted circuit.

10. The method of claim 4 wherein the desired functionality of the redacted portions is achieved by loading the eFPGA fabric generated for each of the one or more redacted portions with a configuration bitstream.

11. The method of claim 3 further comprising:
   generating a description of the eFPGA fabric generated for each of the one or more redacted portions in the hardware description language; and
   substituting, in the soft design, the hardware description language describing each eFPGA for the hardware description language describing each corresponding redacted portion.

12. The method of claim 11 wherein generating a description of each eFPGA in the hardware description language comprises:
   synthesizing the redacted portions of the hardware design language into lookup tables;
   determining a smallest eFPGA fabric size and routing channel width required to map each redacted portion of the circuit onto the eFPGA fabric generated for that redacted portion; and
   using the lookup tables to place and route the redacted portions of the circuit with the eFPGA fabric generated for that redacted portion.

13. The method of claim 11 further comprising:
   optimizing the eFPGAs generated for each of the redacted portions based on a target application for one or more of area, performance, power efficiency, reliability and robustness.

14. The method of claim 13 wherein the eFPGAs generated for the redacted portions are comprised of a plurality of interconnected complex logic blocks and further wherein the optimizing optimizes the complex logic blocks of the eFPGAs, the interconnections of the eFPGAs or both.

15. The method of claim 13 wherein the optimizing comprises:
   generating additional static timing analysis constraints based on a configuration bitstream generated for the eFPGA generated for each of the redacted portions;
   using the additional static timing analysis constraints to implement the optimizations of the eFPGA and improve the performance of the redacted portions; and
   tuning the additional static timing analysis constraints to optimize the interconnections.

16. A system comprising:
   a processor; and
   memory, storing software that when executed by the processor, implements the method of claim 1.

* * * * *